Patented July 20, 1926.

1,593,157

UNITED STATES PATENT OFFICE.

DAVID WERNER BERLIN, OF STOCKHOLM, SWEDEN, ASSIGNOR TO AKTIEBOLAGET FERROLEGERINGAR, OF STOCKHOLM, SWEDEN, A JOINT STOCK COMPANY.

METHOD FOR PRODUCING FERROCHROMIUM AND OTHER FERROALLOYS.

No Drawing. Application filed July 20, 1923, Serial No. 652,865, and in Sweden July 26, 1922.

The present invention refers to a method for producing ferrochromium and other ferroalloys in an electrical furnace by using the ore and the reducing agent as electrodes. With the exception of the aluminothermic method at present all producing of ferrochromium in electrical furnace is performed with aid of carbon electrodes. As the chromium has great disposition to take up carbon from the electrodes the producing of carbon-poor ferrochromium in this manner is a very difficult case. With aid of the new method forming object of this invention to produce ferrochromium in an electrical furnace or combined Martin furnace without using carbon electrodes the art will be in a better position economically and technically.

The invention consists therein, that chromium ore or other ferroalloy ore, as manganese-ore, wolfram-ore, molybdenum-ore, iron-ore or similar mixed with reducing agents, as silicium, solicium-aluminium and alloys of these and fixing agents as water-glass, chloride of magnesium and clay is formed to electrodes (charging electrodes), these electrodes in usual manner being coupled in an electrical furnace and brought against one another or against molten metal or slag. By aid of the resistance heat generated by the electrical energy, which is passing the electrodes and by the voltaic arcs formed at the lower ends, the electrodes will be heated little by little to the reducing of the ore and to the fusion of the reduced metal. The electrodes are fed downwards and are lengthened or substituted with new according as the melting is taking place. By performing the process a chemical slag is often received, which slag can be crushed and mixed with ore for producing new charging electrodes.

For getting the electrodes in a better conducting condition and with a greater resisting power, the same are provided with one or more bodies of electrical conducting material, these bodies being embedded in the mass or surround the same. The bodies suitably consist of iron or a ferroalloy of the same kind as is to be produced or is used as reducing agent, when this agent consists of metal.

As example can be mentioned the producing of ferrochromium in electrical furnace which is performed in the manner, that previous produced metal is molten in the furnace chamber, this metal being covered with a slag layer. The electrodes pass through the slag against the surface of the metal. Between the ends of the electrodes and the surface of the metal voltaic arcs or a resistant layer of high temperature is to be found, from which heat is radiated to the electrodes as well as to the metal surface. Hereby the electrode mass will be heated little by little to the reducing of the ore and the melting of the metal. The reduced molten metal passes directly to the metal bath and is absorbed by this. According to the melting of the electrodes they will be fed downwards and are lengthened or substituted with new in such a manner that the electrical conducting body or bodies will form conductor as well as a link holding the parts together. In certain times metal and slag are discharged from the furnace.

As another example of this invention can be mentioned a direct producing in electrical furnace of ferrochromium alloys with a low percentage of chromium, (rustless iron). The method is performed in such a manner, that the electrode mass is produced of chromium ore and reducing agents and iron ore, when the percentage of iron in the chromium ore is too low, whereafter the mass is pulverized and mixed with fixing agents. Also pieces of iron in one or another form can be mixed in the electrode mass. As electrical conducting material iron in form of tubes or rods can be used, and the electrode mass is stamped in or round the same. When electrodes of a greater diameter are necessary either, several iron tubes of different diameter arranged the one in the other, or a number of rods or bars or both tubes and rods in combination, may be used. Hereby the electrical current will be more uniformly distributed on the area of the electrodes. These are dried till all the water is driven out, and then the electrodes are ready to be coupled into the furnace.

As another example for producing rustless steel and iron with for instance 15% chromium in electrical furnace the following can be mentioned.

The furnace is charged with iron chippings in usual manner, which are molten. When this is molten and has a suitable temperature iron ore in form of pieces or briquettes is added for being brought up to the percentage of carbon. When this is performed the carbon electrodes are taken away and substituted by electrodes of chromium oxide mixed with reducing agents and eventually also iron ore for obtaining a higher temperature by the reaction. When the temperature in the metal bath during the fusion of the electrodes will be too high, some chromium oxide and reducing agents, ferrochromium, iron or other suitable ingredient is directly introduced in the metal bath, these ingredients will take up the heat and regulate the temperature. When the chromium is added, the slag is removed, and then it is tested with iron ore that the percentage of silicium is not too great. Then the metal is ready to be discharged.

The method can also be performed in a Martin furnace with the alterations which are necessary according to the special construction of these furnaces.

Having now particularly described and ascertained the nature of my invention, I declare that what I claim is:

1. Method for producing ferrochromium and other ferroalloys, characterized thereby, that chromium ore or other ferroalloy ore in combination with reducing and fixing agents are formed to electrodes (charging electrodes), which placed against molten slag or metal, are heated in an electrical furnace for the reduction of the ore and the fusion of the metal.

2. Method according to claim 1, characterized thereby, that the electrodes are made conducting by aid of one or more conducting bodies in the mass embedded or the mass surrounding bodies.

3. Method according to claim 1, characterized thereby, that the electrodes are made of chromium ore and iron ore together with reducing and fixing agents.

4. Method according to claim 1, characterized thereby, that the molten metal, in which the electrodes are to be molten, consists of iron or an iron alloy for the purpose of obtaining a ferrochromium alloy.

In testimony whereof I have signed my name to this specification.

DAVID WERNER BERLIN.